United States Patent
Kawase (10) Patent No.: US 9,305,588 B2
(45) Date of Patent: Apr. 5, 2016

(54) DRIVE BASE REGULATION MEMBER FOR DISK DEVICE

(71) Applicant: ALPINE ELECTRONICS, INC., Shinagawa-ku, Tokyo (JP)

(72) Inventor: Hiroshi Kawase, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/596,862

(22) Filed: Jan. 14, 2015

(65) Prior Publication Data

US 2015/0262609 A1    Sep. 17, 2015

(30) Foreign Application Priority Data

Mar. 11, 2014  (JP) .................................. 2014-047848

(51) Int. Cl.
G11B 17/04        (2006.01)
G11B 17/051      (2006.01)

(52) U.S. Cl.
CPC .................................. *G11B 17/051* (2013.01)

(58) Field of Classification Search
CPC .. G11B 17/051; G11B 17/04; G11B 17/0286; G11B 33/08

USPC .......................................................... 720/624
See application file for complete search history.

(56) References Cited

U.S. PATENT DOCUMENTS

| 7,013,471 | B2 * | 3/2006 | Yoshimura ..................... 720/620 |
| 7,287,261 | B2 * | 10/2007 | Kato et al. ..................... 720/604 |
| 2002/0100337 | A1 * | 8/2002 | Tanaka et al. ..................... 74/63 |
| 2006/0136949 | A1 * | 6/2006 | Sato ............................. 720/619 |
| 2011/0202937 | A1 * | 8/2011 | Eguchi et al. ................. 720/621 |
| 2015/0170700 | A1 * | 6/2015 | Kato ............................ 720/624 |

FOREIGN PATENT DOCUMENTS

JP          2002-230878       8/2002

* cited by examiner

*Primary Examiner* — Will J Klimowicz
(74) *Attorney, Agent, or Firm* — Brinks Gilson & Lione (57) ABSTRACT

In a disk device, as a switching slider which is disposed on a drive base moves in a first direction, a roller bracket moves in a second direction and a transport roller moves toward a facing member. Then, a roller bracket serves as a restriction member and the drive base is restricted in a housing. Before the drive base is restricted, a regulation member which is provided on the switching slider abuts a regulation projection of the housing so as to regulate inadvertent upward movement of the drive base. Accordingly, a disk during an unloading operation can be guided to an insertion/ejection port in a reliable manner.

20 Claims, 9 Drawing Sheets

DRIVE BASE REGULATION MEMBER FOR DISK DEVICE

RELATED APPLICATION

The present application claims priority to Japanese Patent Application Number 2014-047848, filed Mar. 11, 2014, the entirety of which is hereby incorporated by reference.

BACKGROUND

1. Field of the Invention

The present disclosure relates to disk devices which include a drive base elastically supported in a housing with a rotation drive unit for holding a disk being mounted on the drive base, and more specifically, to disk devices which are configured to regulate unnecessary movement of a drive base during a time period before the drive base is completely restricted by a restriction mechanism.

2. Description of the Related Art

Disk devices mounted in vehicles are of a so-called slot-in type which allows a disk to be inserted from the front side of the housing in a direction along the disk surface.

In this disk device, the disk inserted from the front side is held between a transport roller and a facing member and is fed into the housing by a rotation force of the transport roller. When the center portion of the disk is held by a rotation drive unit in the housing, the transport roller moves away from the disk to a retracted position. During ejection of the disk, holding of the disk by the rotation drive unit is released. The disk is held between the transport roller and the facing member and is unloaded to the outside of the housing by the rotation force of the transport roller.

In this type of disk device, the drive base that includes the rotation drive unit is elastically supported in the housing. When the disk is rotated by the rotation drive unit, external vibration is not directly transmitted to the rotation drive unit. Further, during ejecting the disk, the drive base is restricted by the restriction mechanism so that the disk is reliably fed to the insertion/ejection port which is located on the front side of the housing.

In recent disk devices, a mechanism section is configured to operate with minimum motor drive, and a releasing operation of the disk held in the rotation drive unit and a restriction operation by the restriction mechanism are generally performed by using a common motor power source. As a result, during an unloading operation of the disk, the drive base may temporarily remain in the state of being elastically supported in a period of time from start of release operation of the disk held in the rotation drive unit to completion of restriction of the drive base by the restriction mechanism.

For example, in a disk player disclosed in Japanese Unexamined Patent Application Publication No. 2002-230878, a roller support member that supports a transport roller serves as part of a restriction mechanism. When a disk is ejected, a cam plate is moved under the power of a motor, and the movement force of the cam plate causes the disk held in the rotation drive unit to be released and the roller support member to rotate. When the transport roller rotates to a position in which the disk can be transported, the roller support member abuts the top plate and the bottom plate of the housing, and the abutment force causes the drive base to be fixed in the housing.

Conventional disk devices have a problem that the drive base which is elastically supported may move in the housing in the period of time from the start of the release operation of the disk held in the rotation drive unit to the completion of restriction of the drive base by the restriction mechanism.

If the transport roller rotating in the unloading direction touches the disk before restriction of the drive base is completed, the disk may move toward the outside of the housing. During this movement, if the drive base moves, the disk in the unloading operation may come into contact with the edge of the insertion/ejection port and the disk may fail to be ejected.

Further, in the disk device which has a shielding member (shutter) at the insertion/ejection port on the front side of the housing, and the shielding member is operated by a shield switching section which is disposed on the drive base, if the drive base moves during the unloading operation of the disk, the shield switching section may fail to open the shielding member.

SUMMARY

Accordingly, it is an object of embodiments of the present invention to provide a disk device that can regulate movement of the drive base during a period of time from the start of the release operation of the disk held in the rotation drive unit to the completion of restriction of the drive base.

According to one aspect of the disclosure, a disk device which includes a drive base elastically supported in a housing with a rotation drive unit for holding a disk being mounted on the drive base, and a transport roller for unloading the disk to an outside of the housing when the disk held by the rotation drive unit is released, the disk device includes a restriction mechanism that restricts the drive base in the housing when the disk is unloaded from the housing by a rotation force of the transport roller, and a regulation member provided in the drive base so as to abut the housing and regulate movement of the drive base during a period of time from the start of an unloading operation of the disk held by the rotation drive unit to the completion of restriction of the drive base by the restriction mechanism.

For example, in the disk device of the above aspect of the disclosure, a release operation of the disk held by the rotation drive unit and a restriction operation of the drive base by the restriction mechanism are performed by transmitting a drive force from the same drive source.

Further, there is a period of time between the start of the release operation of the disk held in the rotation drive unit and the completion of the restriction operation of the drive base by the restriction mechanism, and a regulation operation by the regulation member is performed in this period of time.

In the disk device, there is a period of time from when the disk held in the rotation drive unit is released to when the restriction of the drive base is completed, and in this period of time, the drive base is elastically supported. Since the movement of the drive base in this period of time is regulated by using the regulation member, the disk in the unloading operation can be unloaded in a stable manner.

The disk device according to the above aspect of the disclosure may include a shielding member and a shielding mechanism provided in the housing, the shielding mechanism being configured to move the shielding member between a shielding position in which the shielding member traverses an insertion path of the disk and an open position in which the shielding member is away from the insertion path, and a shield switching section provided in the drive base so as to actuate the shielding mechanism, wherein the drive base is regulated by the regulation member so as not to move in a direction in which the shield switching section is away from the shielding mechanism.

In the disk device having the above configuration, during a period of time from when the disk held in the rotation drive unit is released to when the restriction of the drive base is completed, the drive base is regulated so as not to move in a direction away from the shielding mechanism. Accordingly, the shielding mechanism can be reliably operated by the shield switching section which is disposed on the drive base.

It is preferable that the disk device according to the above aspect of the disclosure includes a facing member that is fixed to the housing and faces the transport roller, a roller bracket that is supported by the drive base and rotatably supports the transport roller, and a roller biasing spring that actuates the roller bracket and moves the transport roller toward the facing member so that the disk is unloaded while being held between the transport roller and the facing member, wherein the drive base is regulated by the regulation member so as not to move in the same direction as the direction in which the transport roller presses the disk against the facing member.

When the disk is pressed against the facing member by the transport roller during an unloading operation of the disk, the drive base may move due to this pressing force and the disk during the unloading operation may often come into contact with the inside of the insertion port. In order to avoid this problem, the drive base can be regulated by the regulation member so as not to move in the direction of the pressing force of the transport roller. Accordingly, the disk in the unloading operation can be fed to the insertion port in a stable manner.

It is preferable that the transport roller starts to rotate in a direction in which the disk is unloaded when the transport roller is away from the facing member, and the drive base is regulated by the regulation member before the transport roller presses the disk against the facing member. In the above configuration, the movement of the drive base is regulated when the rotating transport roller comes into contact with the disk. Accordingly, the disk can be unloaded to the outside of the housing in a stable position.

The disk device according to the above aspect of the disclosure may include a switching slider provided in the drive base so as to perform holding and releasing of the disk by the rotation drive unit, the regulation member being integrally formed with the switching slider, wherein the regulation member abuts an inside of the housing when the switching slider moves in a direction in which the disk held by the rotation drive unit is released and movement of the drive base is regulated.

Further, according to the above aspect of the disclosure, the regulation member can be rotatably provided on the drive base so that part of the regulation member abuts the inside of the housing by a rotation operation of the regulation member and regulates the movement of the drive base.

For example, in the disk device according to the above aspect of the disclosure, the restriction mechanism is provided on a front side of the drive base and the restriction mechanism is configured such that a restriction member is rotatably supported by the drive base and, when the restriction member rotates, part of the restriction member abuts the housing so as to restrict the drive base, and the regulation member is rotated by a rotation force of the restriction member.

The restriction member according to the above aspect of the disclosure may be used as a roller bracket that supports the transport roller.

According to the disk device of embodiments of the invention, the movement of the elastically supported drive base can be reduced during a period of time from the start of a release operation of the disk held in the rotation drive unit to the completion of restriction of the drive base. Accordingly, the disk can be unloaded in a stable state. Further, a shield switching section may be disposed on the drive base, and when the shielding member (shutter) of the housing is operated by the shield switching section, the shielding member can be operated in a reliable manner while regulating the movement of the drive base.

DESCRIPTION OF THE PREFERRED EMBODIMENTS

First Embodiment

Figure 1:
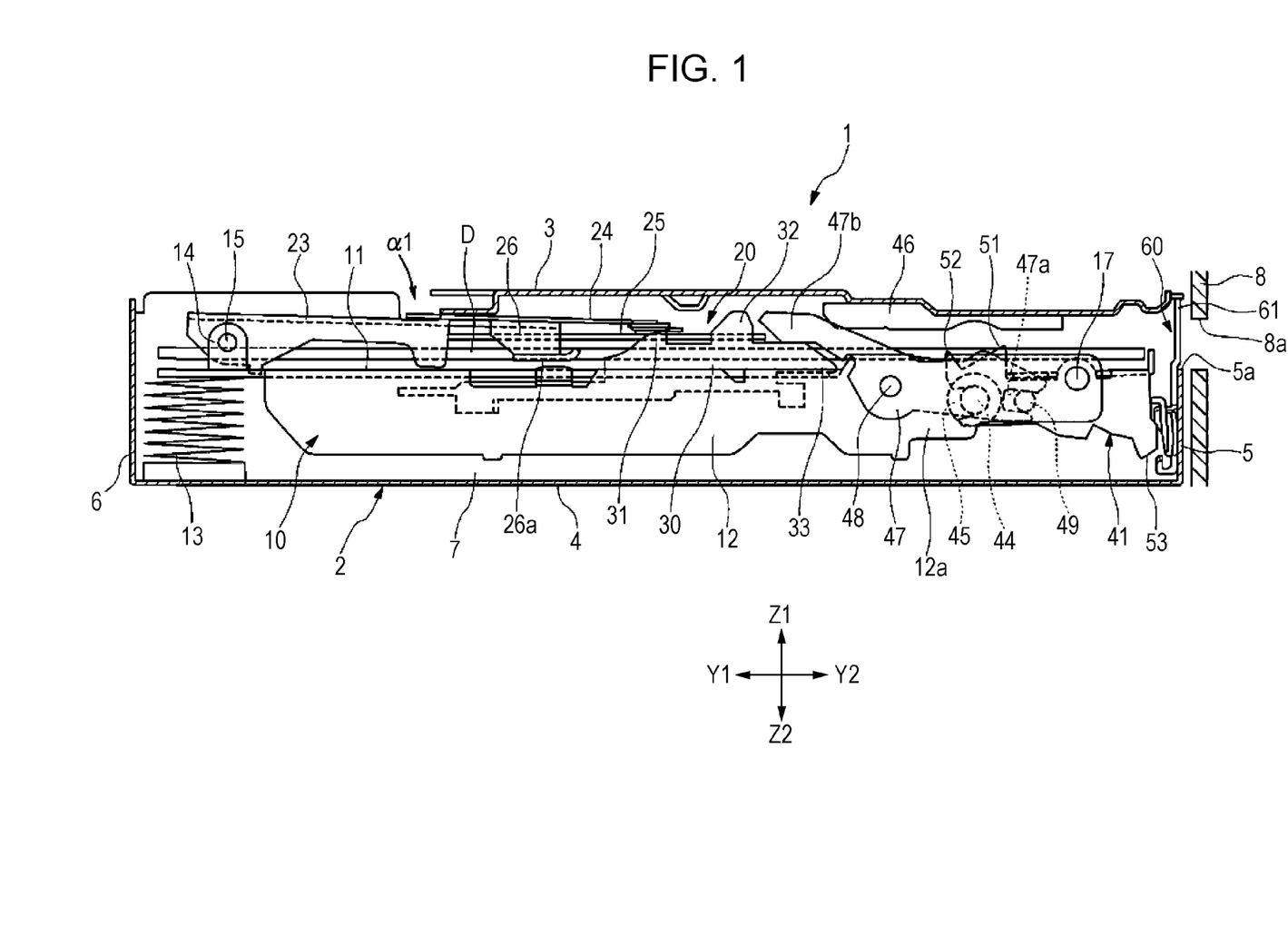
FIG. 1 is a sectional view of a disk device according to a first embodiment of the invention.
Figure 2:
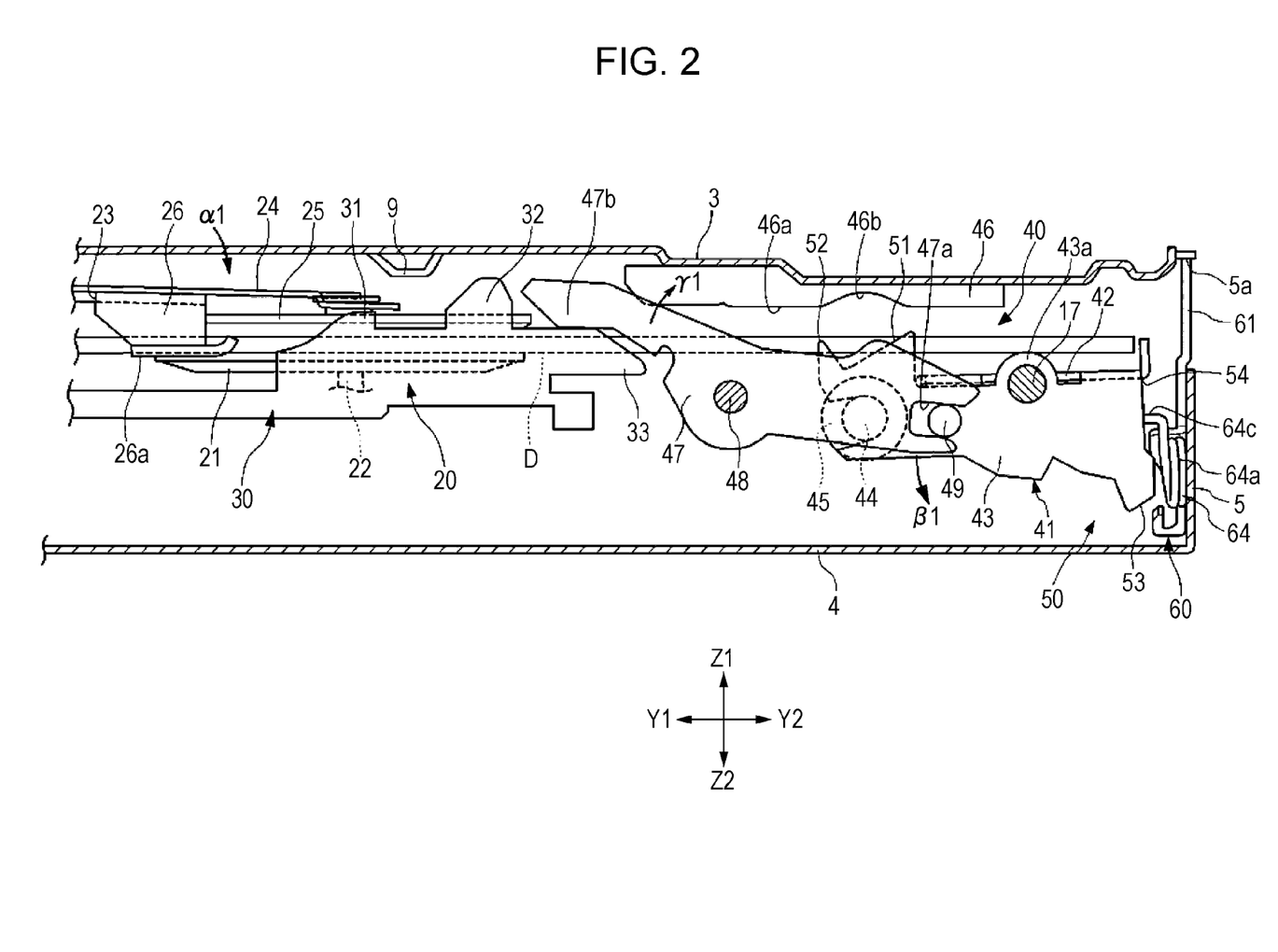
FIG. 2 is a partial sectional view of the disk device according to the first embodiment of the invention, which is in the disk operation state.
Figure 5:
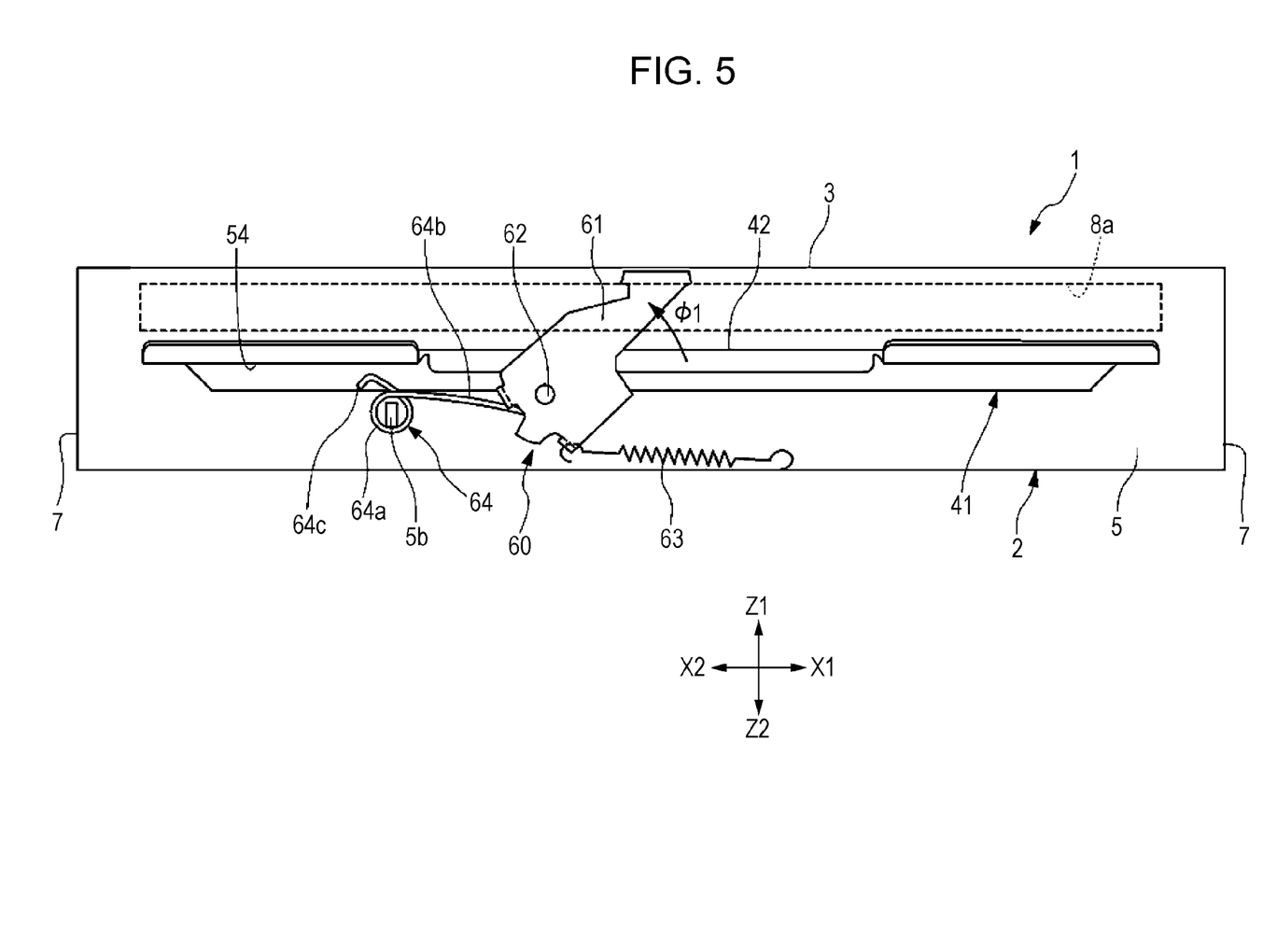
FIG. 5 is a front view of the disk device according to the first embodiment of the invention as seen from the front side of the housing, which is in the disk operation state.
Figure 6:
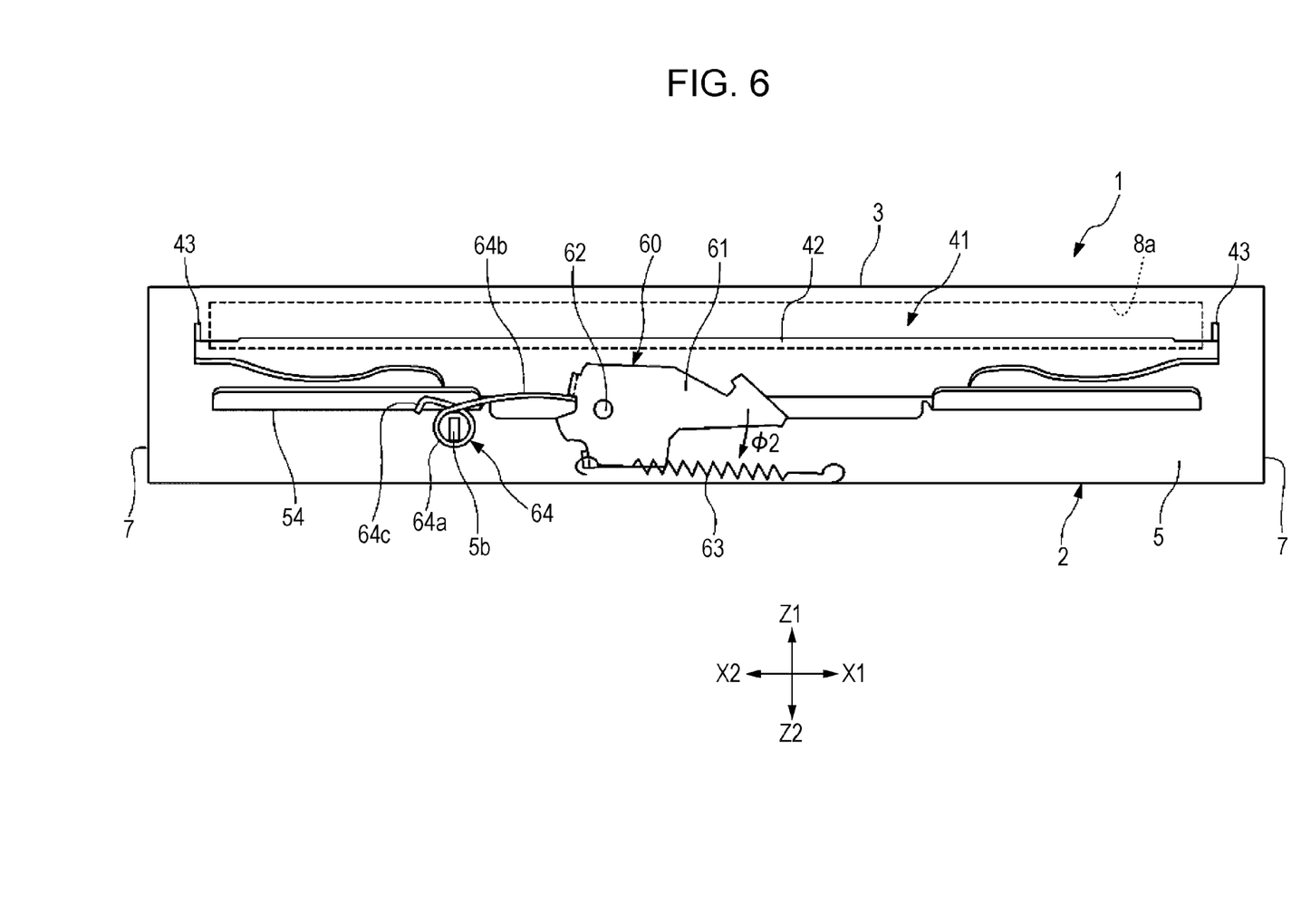
FIG. 6 is a front view of the disk device according to the first embodiment of the invention as seen from the front side of the housing, which is during the disk unloading operation.

In a side view of a disk device 1 according to the first embodiment of the invention which is shown in FIGS. 1 and 2, a Y1 direction indicates a loading direction (toward the back side), a Y2 direction indicates an unloading direction (toward the front side), a Z1 direction indicates an upper side, and a Z2 direction indicates a lower side. In a front view which is shown in FIGS. 5 and 6, an X1 direction indicates a right-hand side and an X2 direction indicates a left-hand side.

The disk device 1 includes a housing 2. The housing 2 is formed of a metal plate. The housing 2 is a cuboid shape which has a top plate 3, a bottom plate 4, a front plate 5 which is located on the front side and is oriented in the unloading direction (front side: Y2 direction), a back plate 6 which is located on the back side and is oriented in the loading direction (back side: Y1 direction), and side plates 7, 7 which are oriented in the right and left direction (X1-X2 direction). The housing 2 has a volume of so-called 1 DIN. When mounted in a vehicle, the housing 2 is placed inside the instrument panel of the vehicle with the front plate 5 facing the inside of the passenger compartment.

As shown in FIG. 1, an opening 5*a* is formed in the front plate 5 of the housing 2. A panel 8 is disposed on the front side of the front plate 5. The panel 8 is a decorative panel, and a display panel and operation buttons are disposed on the panel 8. An insertion/ejection port 8*a* is open to the panel 8.

A disk D is loaded into the housing 2 through the insertion/ejection port 8a and the opening 5a. The disk D in the housing 2 is unloaded to the outside through the opening 5a and the insertion/ejection port 8a.

As shown in FIG. 1, a drive base 10 formed of a metal plate is housed in the housing 2. The drive base 10 includes a drive plate 11 and drive side plates 12, 12 which are bent on each side in the right and left direction (X1-X2 direction). The drive plate 11 is supported by a compression coil spring 13 disposed on the bottom plate 4 on the back side (Y1 direction) in the housing 2. Other spring members and damper members are also disposed in the housing 2 so that the drive base 10 is elastically supported in the housing 2 by elastic support members composed of the damper members, the spring members and the compression coil spring 13.

As shown in FIG. 2, a rotation drive unit 20 is mounted on the drive base 10. The rotation drive unit 20 has a turntable 21. A spindle motor is mounted on the drive base 10 and the turntable 21 is fixed to a rotation shaft 22 of the spindle motor. As shown in FIG. 1, a pair of support pieces 14 which are bent upward are disposed on each side in the right and left direction (X1-X2 direction) on the back side (Y1 direction) of the drive base 10. The clamp arm 23 is disposed on the drive plate 11 of the drive base 10, and a back end of the clamp arm 23 is supported by the support pieces 14 so as to be rotatable about a support shaft 15. A support leaf spring 24 is fixed to the front side of the clamp arm 23, and the clamper 25 is rotatably supported by the support leaf spring 24.

Although not shown in the figure, a clamp spring is disposed on the drive base 10 so as to bias the clamp arm 23 to rotate in a clockwise direction in FIGS. 1 and 2. In FIGS. 1 and 2, a periphery of a center hole of the disk D is placed on the turntable 21, and the clamper 25 is pressed against the disk D in an α1 direction by a biasing force of the clamp spring so that the center portion of the disk D is held by the turntable 21 and the clamper 25.

As shown in FIGS. 1 and 2, a switching slider 30 is mounted on the drive base 10. The switching slider 30 is supported in the inside of the drive side plates 12 of the drive base 10 so as to be linearly movable in the front and back direction (Y1-Y2 direction). The switching slider 30 is disposed at a position spaced from the disk D which is held by the rotation drive unit 20 in the right and left direction (X1-X2 direction) so as not to abut the disk D. A switching motor, which is not shown in the figure, is mounted on the drive base 10, and the switching slider 30 is moved in the Y1-Y2 direction by a drive force of the switching motor.

As shown in FIGS. 1 and 2, the switching slider 30 has a clamp pressing section 31 that extends upward. As shown in FIGS. 1 and 2, the clamp arm 23 has a clamp controlling section 26 which is bent downward and a sliding piece 26a formed by bending the lower end of the clamp controlling section 26. When the switching slider 30 moves in the Y1 direction to a position shown in FIG. 4, the sliding piece 26a is lifted upward by the clamp pressing section 31 and the clamp arm 23 is rotated in the counterclockwise direction (α2 direction). Accordingly, the clamper 25 moves away from the disk D so as to release the holding of the disk D.

As shown in FIGS. 1 and 2, a regulation member 32 that extends upward is integrally formed with the switching slider 30 on the front side (Y2 direction) with respect to the clamp pressing section 31. A regulation projection 9 that extends downward is disposed on the underside (inner surface) of the top plate 3 of the housing 2. The regulation projection 9 is integrally formed with the top plate 3.

Figure 3:
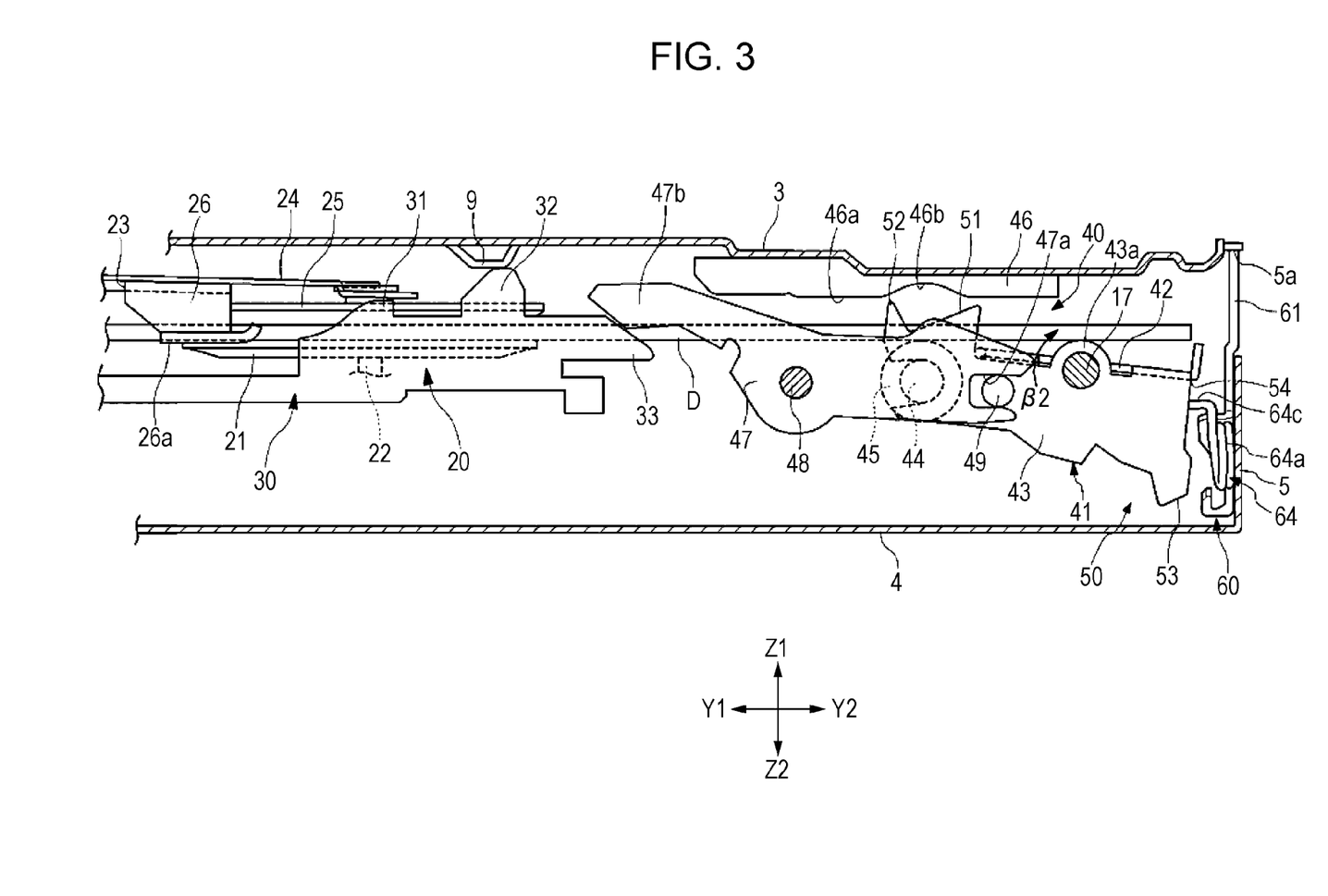
FIG. 3 is a partial sectional view of the disk device according to the first embodiment of the invention, which is at the start of disk ejection.

When the regulation member 32 abuts the underside of the regulation projection 9 as shown in FIG. 3 during the process in which the switching slider 30 moves in the Y1 direction from the state shown in FIG. 2, the drive base 10 is regulated so as not to move upward (Z1 direction) even if an external vibration is applied.

A transportation mechanism 40 is disposed in the inside of the front plate 5 of the housing 2. The transportation mechanism 40 has a roller bracket 41. As shown in FIGS. 5 and 6, the roller bracket 41 has a length which extends in the right and left direction (X1-X2 direction). The roller bracket 41 includes a guide plate 42 which extends in the right and left direction and support side plates 43 which are bent downward on each side in the right and left direction. As shown in FIG. 1, front portions of the drive side plates 12 of the drive base 10 serve as rotation support sections 12a, and a support shaft 17 is fixed to the rotation support sections 12a. The support side plates 43 of the roller bracket 41 are placed on the inner side of the rotation support sections 12a and are connected by the support shaft 17. Accordingly, the roller bracket 41 is supported by the rotation support sections 12a so as to be rotatable in a β1 direction shown in FIG. 2 and in a β2 direction shown in FIGS. 3 and 4.

As shown in FIGS. 1 and 2, a roller shaft 44 is rotatably supported by the Y1 side end of the support side plates 43 of the roller bracket 41 which are bent on each side in the right and left direction, and a transport roller 45 made of a synthetic rubber material is fitted around the outer periphery of the roller shaft 44.

In a transportation mechanism 40, a facing member 46 is fixed to the underside of the top plate 3 of the housing 2. The facing member 46 is made of a synthetic rubber material having low friction coefficient. The lower surface of the facing member 46 is a sliding surface 46a, and a shaft recess 46b which extends in a shaft direction of the transport roller 45 is formed on the sliding surface 46a.

Figure 4:
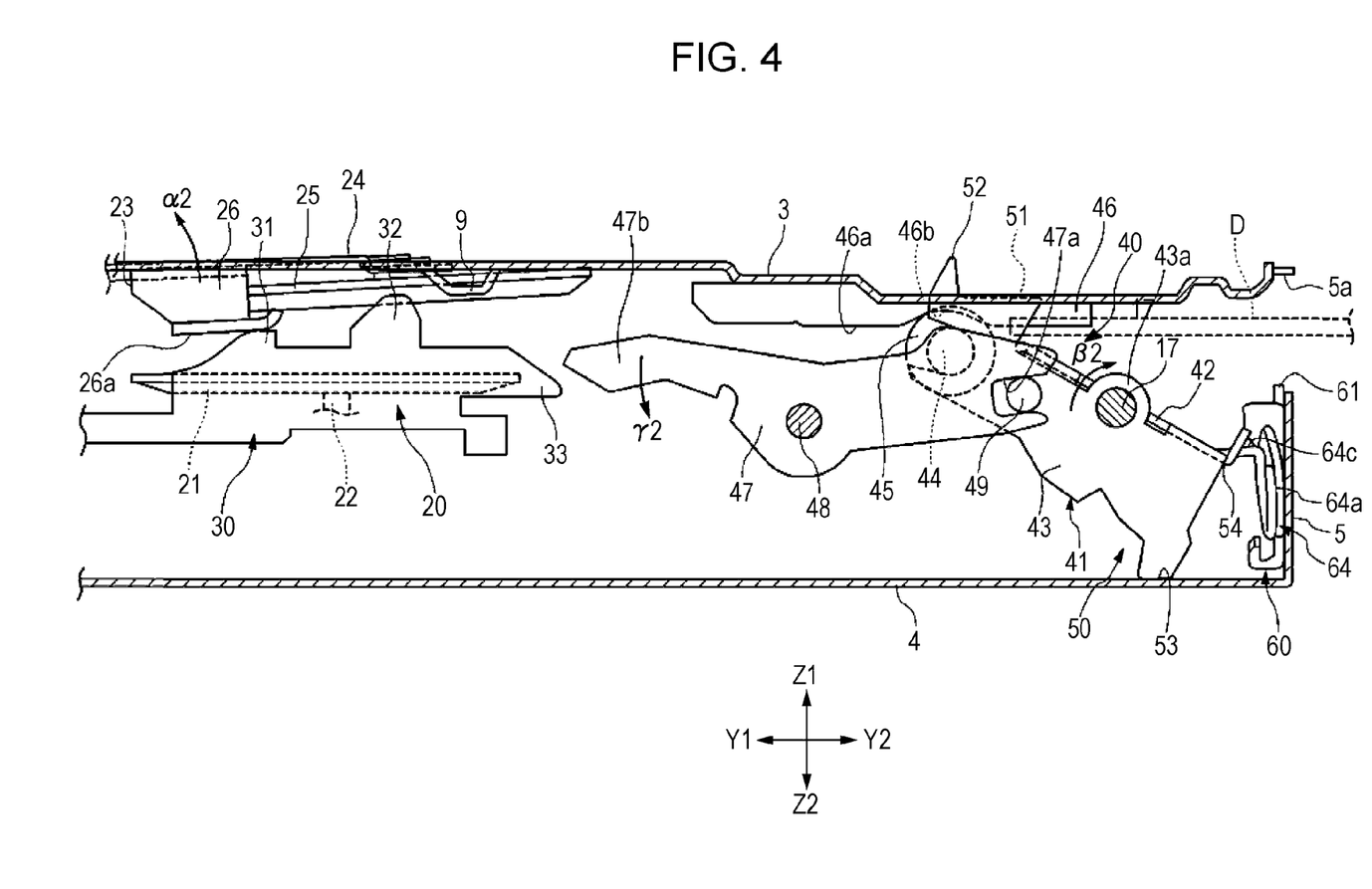
FIG. 4 is a partial sectional view of the disk device according to the first embodiment of the invention, which is during the disk ejection operation.

The roller bracket 41 is biased in the β2 direction by a roller biasing spring, which is not shown in the figures. When no external force acts on the roller bracket 41, the transport roller 45 is brought into press contact with the facing member 46 by the biasing force from the roller biasing spring so that the disk D is held between the transport roller 45 and the facing member 46 as shown in FIG. 4.

As shown in FIG. 1, a transmission member 47 is disposed on the inner side of the rotation support sections 12a which are formed on the drive side plates 12 of the drive base 10. A support shaft 48 that extends inward is fixed to the rotation support section 12a, and the transmission member 47 is rotatably supported by the support shaft 48. A connection recess 47a is formed on the Y2 side end of the transmission member 47. A connection shaft 49 is fixed to the support side plate 43 of the roller bracket 41, and the connection recess 47a and the connection shaft 49 engage each other.

As shown in FIG. 2, a projecting section 47b is integrally formed with the Y1 side end of the transmission member 47. A lifting cam section 33 is integrally formed with the Y2 side end of the switching slider 30. As shown in FIG. 2, as the switching slider 30 is moved to the front side (Y2 direction), the projecting section 47b is lifted by the lifting cam section 33, which causes the transmission member 47 to be rotated in a γ1 direction. Then, the roller bracket 41 is rotated by a transmission force of the transmission member 47 in the β1 direction against the biasing force of the roller biasing spring. As shown in FIG. 4, as the switching slider 30 moves in the Y1 direction, the lifting cam section 33 moves away from the projecting section 47b. Accordingly, since the transmission member 47 and the roller bracket 41 release a restriction force, the roller bracket 41 is rotated by the biasing force of the roller biasing spring in the β2 direction as shown in FIG. 4.

As shown in FIG. 2, an upper restriction section 51 is formed on the support side plate 43 of the roller bracket 41, and an engaging projection 52 extends from part of the upper restriction section 51. A lower restriction section 53 is formed on the support side plate 43 at a position which opposes the upper restriction section 51 with the support shaft 17 therebetween. The roller bracket 41 serves as a restriction member. Further, a restriction mechanism 50 is formed by the transmission member 47 and the roller bracket 41.

As shown in FIGS. 2 and 5, a shielding mechanism 60 is disposed between the front plate 5 of the housing 2 and the transportation mechanism 40. The shielding mechanism 60 includes a shielding member (shutter) 61. The shielding member 61 is rotatably supported by the support shaft 62 which is fixed on the inner surface of the front plate 5. As shown in FIG. 5, a shield spring 63 is hung between the shielding member 61 and the front plate 5. The shield spring 63 is an extension spring and the shielding member 61 is constantly biased in a φ1 direction by a biasing force of the shield spring 63.

A switching transmission member 64 is disposed in the shielding mechanism 60. The switching transmission member 64 is a torsion spring, and a winding section 64a is supported by a spring support section 5b which is disposed in the inside of the front plate 5. A bias arm 64b is disposed on the switching transmission member 64 and engages with the shielding member 61. An operation arm 64c extends from the switching transmission member 64. As shown in FIG. 2, a shield switching section 54 is formed on the Y2 side end of the roller bracket 41 so that the shield switching section 54 presses against the operation arm 64c.

Next, the operation of the disk device 1 will be described.
Disk Loading Operation FIG. 4 shows a state in which the disk D is loaded. In FIG. 4, the switching slider 30 is moved in the Y1 direction, the clamp arm 23 is lifted in the α2 direction by the clamp pressing section 31, and the clamper 25 is positioned upwardly away from the turntable 21 in the rotation drive unit 20.

The lifting cam section 33 of the switching slider 30 moves away from the projecting section 47b of the transmission member 47, and the roller bracket 41 is rotated in the β2 direction by the biasing force of the roller biasing spring. The transport roller 45 is brought into press contact with the shaft recess 46b of the facing member 46.

The roller bracket 41 serves as a restriction member that forms the restriction mechanism 50, and when the biasing force of the roller biasing spring acts on the roller bracket 41, the upper restriction section 51 abuts the inner surface of the top plate 3 of the housing 2 and the engaging projection 52 engages with an opening which is formed in the top plate 3. Further, the lower restriction section 53 is brought into press contact with the inner surface of the bottom plate 4 of the housing 2. Accordingly, at least a front portion (on the Y2 side) of the drive base 10 is restricted in the housing 2.

In the state shown in FIGS. 4 and 6, the operation arm 64c of the switching transmission member 64 which is disposed on the shielding mechanism 60 is pushed down by the shield switching section 54 which is formed on the roller bracket 41. As a result, the shielding member 61 is rotated in a φ2 direction by the bias arm 64b of the switching transmission member 64, which is a torsion spring. The shielding member 61 is rotated to a release position shown in FIG. 6, resisting against an elastic force of the shield spring 63, and the insertion/ejection port 8a is open.

The disk D is inserted into the housing 2 through the insertion/ejection port 8a and the opening 5a. When this is detected by a detection member disposed in the housing 2, the transportation motor is actuated. The rotation force of the transportation motor is transmitted to the roller shaft 44 via a gear mechanism, which is not shown in the figure, so that the roller shaft 44 is rotated in the loading direction. Accordingly, the disk D is held between the transport roller 45 and the facing member 46 and is fed into the housing 2 by the rotation force of the transport roller 45.

When the loading detection member detects that the center portion of the loaded disk D is moved onto the turntable 21, the switching motor is actuated. Then, the drive force of the switching motor is transmitted to the switching slider 30 and the switching slider 30 is moved in the Y2 direction. During this movement, as shown in FIG. 3, the clamper pressing section 31 of the switching slider 30 is moved away from the sliding piece 26a of the clamp controlling section 26, and the clamp arm 23 is rotated in the α1 direction by the biasing force of the clamp spring. Accordingly, the center portion of the disk D is pressed against the turntable 21 by the clamper 25, and the disk D is held by the rotation drive unit 20.

When the switching slider 30 is advanced to a position shown in FIG. 2, the projecting section 47b is lifted by the lifting cam section 33 and the transmission member 47 is rotated in the γ1 direction. This rotation force causes the roller bracket 41 to be rotated in the β1 direction, and accordingly, the transport roller 45 is moved away from the disk D. The transport roller 45 is moved away from the disk D while rotating in the loading direction, and in the state shown in FIG. 2, the transportation motor stops and the transport roller 45 stops. Further, the upper restriction section 51 and the lower restriction section 53 of the roller bracket 41 move away from the top plate 3 of the housing 2 and the bottom plate 4. Accordingly, the restriction by the restriction mechanism 50 is released and the drive base 10 is elastically supported by the elastic member.

As shown in FIGS. 2 and 5, when the roller bracket 41 is rotated in the β1 direction, the shield switching section 54 which is part of the roller bracket 41 is moved away from the operation arm 64c of the switching transmission member 64. The shielding member 61 is rotated in the φ1 direction by the shield spring 63 and is moved to a shielding position. The insertion/ejection port 8a and the opening 5a are closed from the inside by the shielding member 61. Accordingly, it is possible to prevent another disk from being inadvertently inserted into the housing 2.

In the state in which the drive base 10 is elastically supported, the spindle motor of the rotation drive unit 20 rotates, thereby rotating the disk D. Then, playing or recording of information on the disk D is performed by a head, which is not shown in the figure, which is supported by the drive base 10.
Disk Unloading Operation When an instruction to eject the disk D from the housing 2 is inputted by operating the operation buttons on the panel 8 or a remote controller, the switching motor on the drive base 10 is actuated to move the switching slider 30 in the Y1 direction from the position shown in FIGS. 1 and 2. Then, the transportation motor is actuated almost at the same time so that the transport roller 45 is rotated in the unloading direction (clockwise direction) from the state shown in FIGS. 1 and 2.

When the switching slider 30 is moved in the Y1 direction from the position shown in FIG. 2 and becomes the state shown in FIG. 3, the lifting cam section 33 on the Y2 side end of the switching slider 30 starts to move away from the projecting section 47b of the transmission member 47. Accordingly, the transmission member 47 becomes rotatable in the γ2 direction, and the roller bracket 41 starts to rotate in the β2 direction (clockwise direction) by the biasing force of the roller biasing spring, which causes the rotating transport roller 45 to move toward the underside of the disk D.

While the switching slider 30 moves from the position shown in FIG. 3 to the position shown in FIG. 4, the clamp pressing section 31 formed on the switching slider 30 moves into the lower side of the sliding piece 26a of the clamp controlling section 26. The clamp arm 23 starts to rotate in the α2 direction (counterclockwise direction), and the clamper 25 starts to move upward away from the disk D. Since the disk D is lifted at the same time by the transport roller 45 which is rotating in the unloading direction, the holding of the disk D by the turntable 21 is released. In so doing, the unloading force in the Y2 direction starts to act on the disk D.

While the switching slider 30 moves from the position shown in FIG. 3 to the position immediately before the position shown in FIG. 4, the regulation member 32 formed on the switching slider 30 abuts and slides on the underside of the regulation projection 9 formed on the top plate 3 of the housing 2. This regulates the drive base 10 which is elastically supported so as not to be lifted upward (Z1 direction). When the drive base 10 on which the disk D is loaded is elastically supported and in a neutral position, the regulation member 32 and the regulation projection 9 are relatively positioned so that the upper end of the regulation member 32 and the lower end of the regulation projection 9 are located at the same level, and the drive base 10 is regulated so as not to move upward from the neutral position. Alternatively, when the upper end of the regulation member 32 abuts the lower end of the regulation projection 9, the drive base 10 on which the disk D is loaded may be pushed slightly downward (Z2 direction) from the neutral position.

When the released disk D is lifted by the transport roller 45, the drive base 10 is regulated so as not to move in the Z1 direction which is a lifting direction by the transport roller 45 due to abutment of the regulation member 32 and the regulation projection 9. Accordingly, the disk D is guided to the insertion/ejection port 8a, and this eliminates a problem of the disk D abutting the upper periphery of the insertion/ejection port 8a and failing to be ejected.

When the roller bracket 41 is further rotated in the β2 direction from the position shown in FIG. 3, the shield switching section 54 of the roller bracket 41 engages and downwardly presses the operation arm 64c of the switching transmission member 64. A torsion force is applied by the operation arm 64c to the winding section 64a of the switching transmission member 64 which is a torsion spring, and the bias arm 64b is rotated upward by the elastic force, which causes the shielding member 61 to be rotated in the φ2 direction to the release position.

When the shield switching section 54 engages the operation arm 64c, the regulation member 32 engages the regulation projection 9 as shown in FIG. 3. The movement of the drive base 10 in the Z1 direction is regulated and the movement of the shield switching section 54 in the direction away from the operation arm 64c is regulated. Accordingly, the operation arm 64c can be reliably operated by the shield switching section 54, and the operation arm 64c does not need to be formed to have an excessively long length.

When the switching slider 30 is moved to the position shown in FIG. 4, the clamp arm 23 is largely rotated in the α2 direction by the clamp pressing section 31, and the clamper 25 is largely moved upward away from the turntable 21.

Further, the transport roller 45 moves in a direction in which the transport roller 45 is brought into press contact with the facing member 46, and the disk D is held between the transport roller 45 and the facing member 46 to be ejected through the insertion/ejection port 8a.

When the switching slider 30 is detected by a limit switch, which is not shown in the figure, that it comes to the position shown in FIG. 4, the switching motor stops and the switching slider 30 stops at the position shown in FIG. 4. Since the switching slider 30 moves away from the transmission member 47, the roller bracket 41 which is a restriction member is rotated in the β2 direction by the biasing force of the roller biasing spring. Then, the upper restriction section 51 abuts the top plate 3 and the engaging projection 52 engages with the top plate 3, while the lower restriction section 53 abuts the bottom plate 4 and the front portion of the drive base 10 is restricted in the housing 2 by the roller bracket 41.

In so doing, as shown in FIG. 4, the regulation member 32 formed on the switching slider 30 moves away from the regulation projection 9 formed on the top plate 3. Accordingly, it is possible to prevent an excessive restriction force from being applied on the drive base 10, and prevent fatigue of an elastic support member that supports the drive base 10.

Second Embodiment

Figure 7:
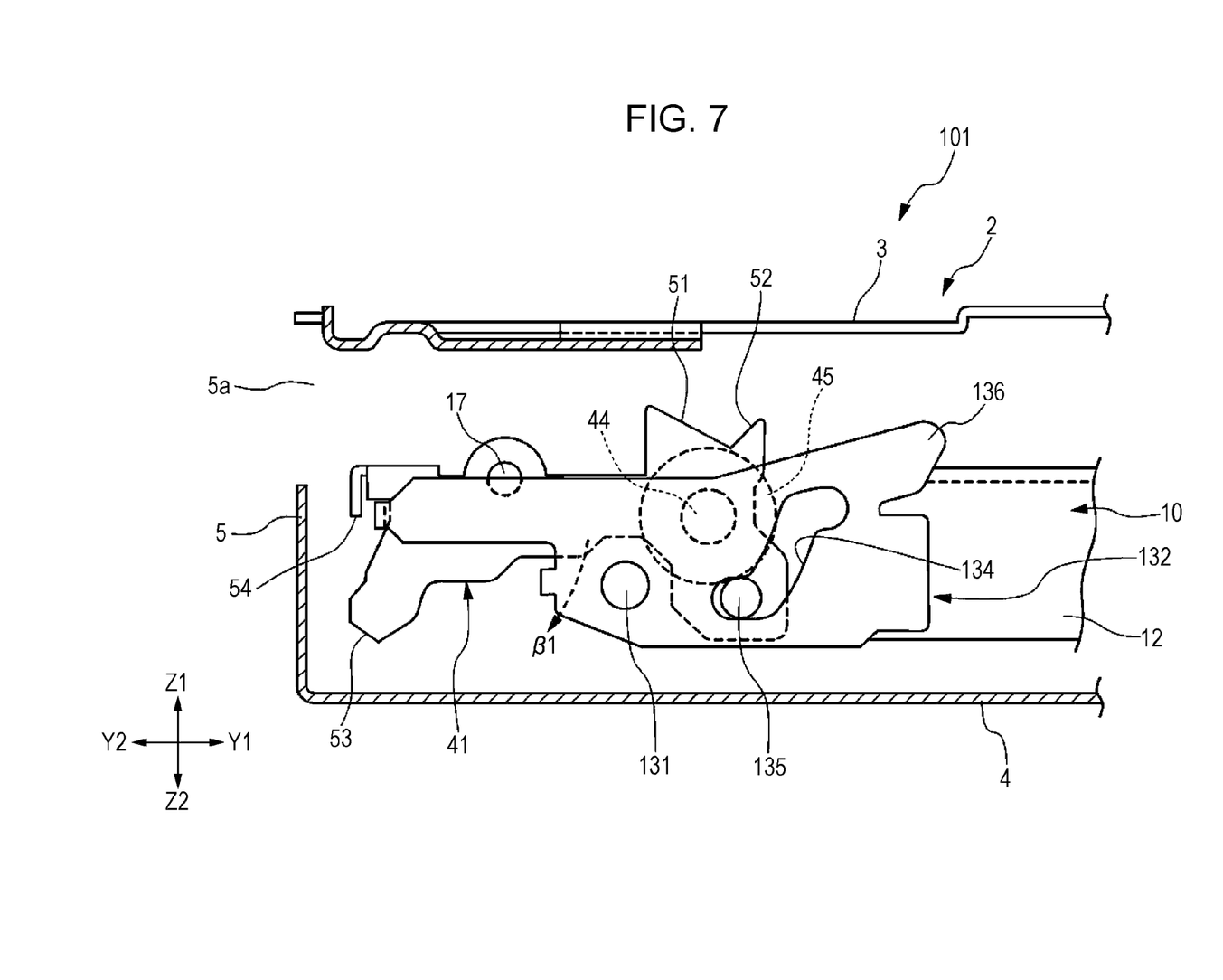
FIG. 7 is a partial sectional view of the disk device according to a second embodiment of the invention, which is in the disk operation state.
Figure 8:
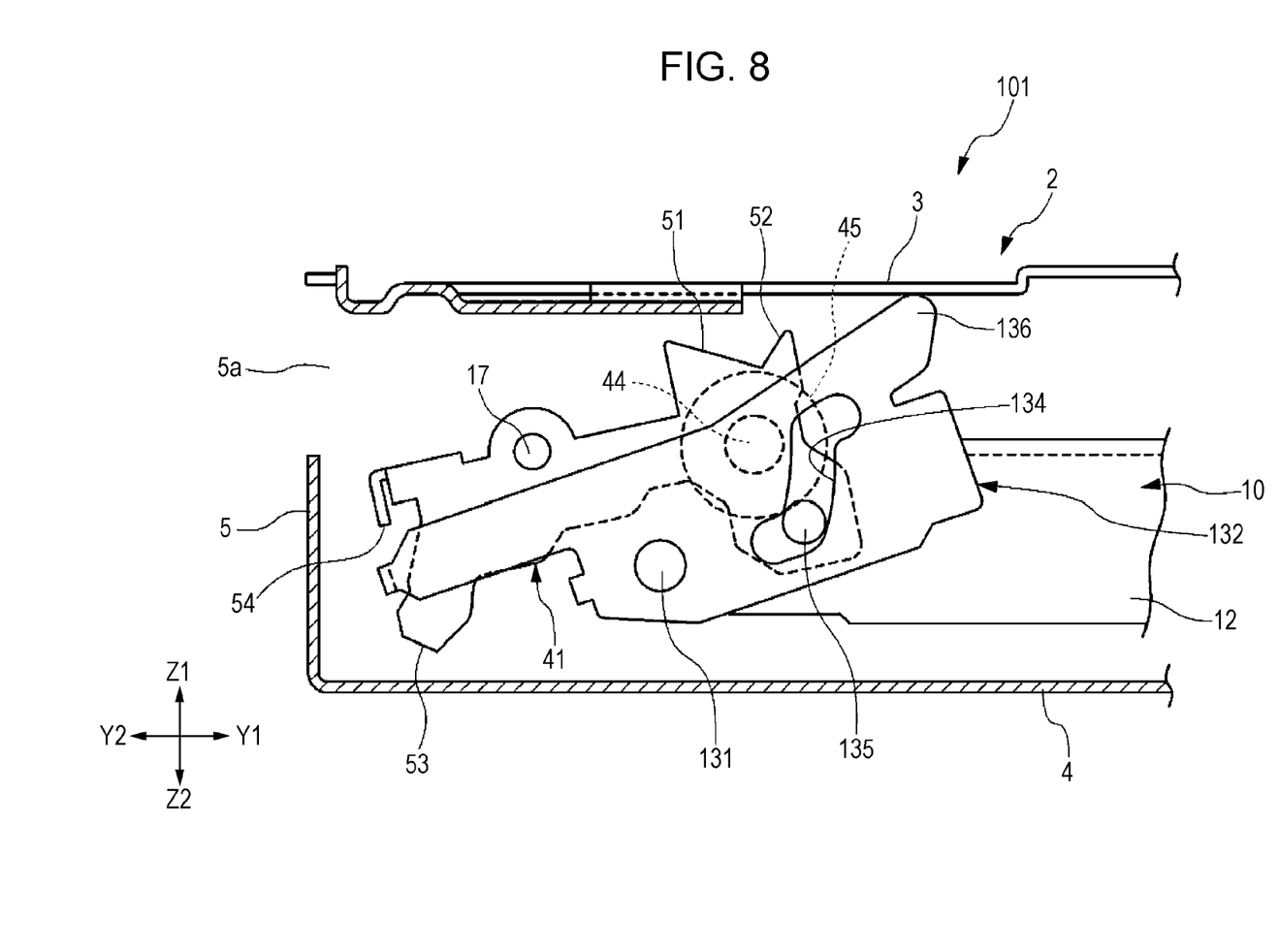
FIG. 8 is a partial sectional view of the disk device according to the second embodiment of the invention, which is at the start of disk ejection.
Figure 9:
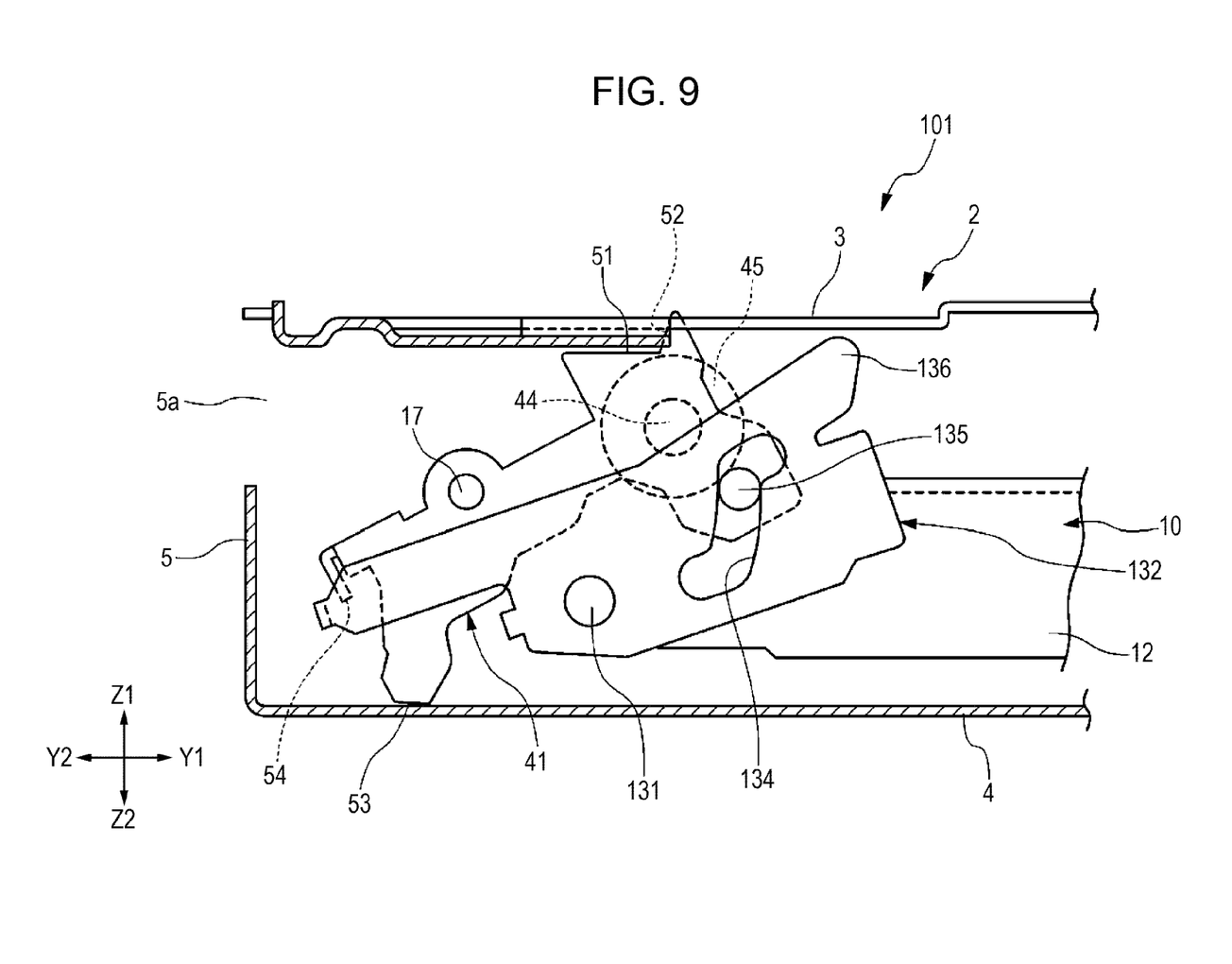
FIG. 9 is a partial sectional view of the disk device according to the second embodiment of the invention, which is during the disk ejection operation.

A disk device 101 of a second embodiment shown in FIGS. 7 to 9 has the housing 2 which is the same as that of the first embodiment. However, in FIGS. 7 to 9, the right and left direction of the housing 2 is oriented opposite to that of the first embodiment, and the loading direction (Y1 direction) is oriented to the right-hand direction in the figure, while the unloading direction (Y2 direction) is oriented to the left-hand direction in the figure.

As shown in FIGS. 7 to 9, the drive base 10 is elastically supported in the housing 2. Similar to the first embodiment, the roller bracket 41 which also serves as a restriction member is rotatably supported about the support shaft 17 on the front side in the housing 2. The roller shaft 44 is supported by the roller bracket 41, and the transport roller 45 is mounted on the roller shaft 44. Although not shown in FIGS. 7 to 9, the facing member 46 is fixed to the inner surface of the top plate 3 of the housing 2, and the disk D is transported while being held between the transport roller 45 and the facing member 46.

Although not shown in the figure, the shielding mechanism 60 is disposed inside the front plate 5 of the housing 2. The shielding member 61 comes to a closed position when the switching transmission member 64 is pushed by the shield switching section 54 formed on the front side of the roller bracket 41.

The upper restriction section 51 and the engaging projection 52 are integrally formed on one end of the roller bracket 41, while the lower restriction section 53 is integrally formed on the other end of the roller bracket 41.

Similar to the first embodiment, the switching slider 30 and the transmission member 47 are disposed on the drive base 10, and the roller bracket 41 is rotated when a force of the switching slider 30 is transmitted to the roller bracket 41 via the transmission member 47.

Although the regulation member 32 is integrally formed with the switching slider 30 in the first embodiment, a regulation member 132 is rotatably supported by the drive side plate 12 of the drive base 10 in the second embodiment FIGS. 7 to 9. A regulation abutment section 136 is formed on the regulation member 132.

The regulation member 132 is rotatably supported on the drive side plate 12 by the support shaft 131. A regulation cam section 134 is formed on the regulation member 132. The regulation cam section 134 is a cam long hole, and a control pin 135 fixed to the roller bracket 41 is slidably inserted in the regulation cam section 134.

In the disk device of the second embodiment, when the disk D is actuated in the rotation drive unit 20, the roller bracket 41 rotates in the β1 direction as shown in FIG. 7, and the transport roller 45 moves downward so as not to engage the disk D.

During ejection of the disk D, as the switching slider 30 moves in the Y1 direction, the roller bracket 41 rotates in the β2 direction as shown in FIGS. 8 and 9. In so doing, as the control pin 135 of the roller bracket 41 slides in the regulation cam section 134, the regulation member 132 is first rotated in the counterclockwise direction. Then, in the state of FIG. 8, the regulation abutment section 136 abuts the top plate 3 and the drive base 10 is regulated so as not to move further upward. As shown in FIG. 9, when the roller bracket 41 further rotates in the β2 direction, the disk D can be held between the transport roller 45 and the facing member 46. Then, the upper restriction section 51 of the roller bracket 41 is brought into press contact with the top plate 3, and the lower restriction section 53 is brought into press contact with the bottom plate 4, thereby restricting the drive base 10.

In FIG. 9, the regulation member 132 has been rotated in the clockwise direction, and the regulation abutment section 136 is moved away from the top plate 3 and regulation by the regulation member 132 is released.

In the second embodiment, the regulation member 132 abuts the top plate 3 in the state of FIG. 8, and upward movement of the drive base 10 is regulated. This timing is the same as the timing at which the regulation member 32 abuts the regulation projection 9 in the first embodiment. Accordingly, the disk D can be reliably moved to the insertion/ejection port 8a, and the shielding mechanism 60 can be appropriately operated by the roller bracket 41.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A disk device which includes a drive base elastically supported in a housing with a rotation drive unit for holding a disk mounted on the drive base, and a transport roller for unloading the disk to an outside of the housing when the disk held by the rotation drive unit is released, the disk device comprising:
    a restriction mechanism that restricts the drive base in the housing when the disk is unloaded from the housing by a rotation force of the transport roller; and
    a regulation member provided in the drive base so as to abut the housing and regulate movement of the drive base during a period of time from a start of an unloading operation of the disk held by the rotation drive unit to completion of restriction of the drive base by the restriction mechanism.

2. The disk device according to claim 1, wherein a release operation of the disk held by the rotation drive unit and a restriction operation of the drive base by the restriction mechanism are performed by transmitting a drive force from one drive source.

3. The disk device according to claim 2, wherein there is a period of time between start of the release operation of the disk held in the rotation drive unit and completion of the restriction operation of the drive base by the restriction mechanism, and a regulation operation by the regulation member is performed in this period of time.

4. The disk device according to claim 1, further comprising a shielding member and a shielding mechanism provided in the housing, the shielding mechanism being configured to move the shielding member between a shielding position in which the shielding member traverses an insertion path of the disk and an open position in which the shielding member is away from the insertion path, and a shield switching section provided in the drive base so as to actuate the shielding mechanism, wherein the drive base is regulated by the regulation member so as not to move in a direction in which the shield switching section is moved away from the shielding mechanism.

5. The disk device according to claim 1, further comprising a facing member that is fixed to the housing and faces the transport roller, and a roller bracket that is supported by the drive base and rotatably supports the transport roller, wherein the roller bracket is actuated and the transport roller is moved toward the facing member so that the disk is unloaded while being held between the transport roller and the facing member, wherein the drive base is regulated by the regulation member so as not to move in the same direction as the direction in which the transport roller presses the disk against the facing member.

6. The disk device according to claim 5, wherein the transport roller starts to rotate in a direction in which the disk is unloaded when the transport roller is away from the facing member, and the drive base is regulated by the regulation member before the transport roller presses the disk against the facing member.

7. The disk device according to claim 1, further comprising a switching slider provided in the drive base so as to perform holding and releasing of the disk by the rotation drive unit, the regulation member being integrally formed with the switching slider, wherein the regulation member abuts an inside of the housing when the switching slider moves in a direction in which the disk held by the rotation drive unit is released and movement of the drive base is regulated.

8. The disk device according to claim 1, wherein the regulation member is rotatably provided on the drive base so that part of the regulation member abuts the inside of the housing by a rotation operation of the regulation member and regulates the movement of the drive base.

9. The disk device according to claim 8, wherein the restriction mechanism is provided on a front side of the drive base and the restriction mechanism is configured such that a restriction member is rotatably supported by the drive base and, when the restriction member rotates, part of the restriction member abuts the housing so as to restrict the drive base, and the regulation member is rotated by a rotation force of the restriction member.

10. The disk device according to claim 9, wherein the restriction member constitutes a roller bracket that supports the transport roller.

11. A disk device which includes a drive base elastically supported in a housing with a rotation drive unit for holding a disk mounted on the drive base, and a transport roller for unloading the disk to an outside of the housing when the disk held by the rotation drive unit is released, the disk device comprising:
- a restriction mechanism that restricts the drive base in the housing when the disk is unloaded from the housing by a rotation force of the transport roller; and
- a regulation member provided in the drive base so as to regulate movement of the drive base during a period of time from a start of an unloading operation of the disk held by the rotation drive unit to completion of restriction of the drive base by the restriction mechanism.

12. The disk device according to claim 11, wherein a release operation of the disk held by the rotation drive unit and a restriction operation of the drive base by the restriction mechanism are performed by transmitting a drive force from one drive source.

13. The disk device according to claim 12, wherein there is a period of time between start of the release operation of the disk held in the rotation drive unit and completion of the restriction operation of the drive base by the restriction mechanism, and a regulation operation by the regulation member is performed in this period of time.

14. The disk device according to claim 11, further comprising a shielding member and a shielding mechanism provided in the housing, the shielding mechanism being configured to move the shielding member between a shielding position in which the shielding member traverses an insertion path of the disk and an open position in which the shielding member is away from the insertion path, and a shield switching section provided in the drive base so as to actuate the shielding mechanism, wherein the drive base is regulated by the regulation member so as not to move in a direction in which the shield switching section is moved away from the shielding mechanism.

15. The disk device according to claim 11, further comprising a facing member that is fixed to the housing and faces the transport roller, and a roller bracket that is supported by the drive base and rotatably supports the transport roller, wherein the roller bracket is actuated and the transport roller is moved toward the facing member so that the disk is unloaded while being held between the transport roller and the facing member, wherein the drive base is regulated by the regulation member so as not to move in the same direction as the direction in which the transport roller presses the disk against the facing member.

16. The disk device according to claim 15, wherein the transport roller starts to rotate in a direction in which the disk is unloaded when the transport roller is away from the facing member, and the drive base is regulated by the regulation member before the transport roller presses the disk against the facing member.

17. The disk device according to claim 11, further comprising a switching slider provided in the drive base so as to perform holding and releasing of the disk by the rotation drive unit, the regulation member being integrally formed with the switching slider, wherein movement of the drive base is regulated by the regulation member when the switching slider moves in a direction in which the disk held by the rotation drive unit is released.

18. The disk device according to claim 11, wherein the regulation member is rotatably provided on the drive base so that a rotation operation of the regulation member regulates the movement of the drive base.

19. The disk device according to claim 18, wherein the restriction mechanism is provided on a front side of the drive base and the restriction mechanism is configured such that a restriction member is rotatably supported by the drive base and, when the restriction member rotates, part of the restriction member abuts the housing so as to restrict the drive base, and the regulation member is rotated by a rotation force of the restriction member.

20. The disk device according to claim 19, wherein the restriction member constitutes a roller bracket that supports the transport roller.

\* \* \* \* \*